US012344517B2

(12) United States Patent
Otto et al.

(10) Patent No.: US 12,344,517 B2
(45) Date of Patent: Jul. 1, 2025

(54) WORK ASSIST SYSTEM FOR AN INDUSTRIAL VEHICLE

(71) Applicant: Crown Equipment Corporation, New Bremen, OH (US)

(72) Inventors: Matthew Jacob Otto, New Bremen, OH (US); Adam M. Ruppert, Wapakoneta, OH (US); Kyle Gigandet, Versailles, OH (US); Craig J. Rekow, Troy, OH (US); Megan Wenning, Fort Loramie, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/519,492

(22) Filed: Nov. 27, 2023

(65) Prior Publication Data

US 2024/0092619 A1    Mar. 21, 2024

Related U.S. Application Data

(63) Continuation of application No. 17/648,846, filed on Jan. 25, 2022, now Pat. No. 11,866,310.

(60) Provisional application No. 63/143,351, filed on Jan. 29, 2021.

(51) Int. Cl.
*F16M 11/00* (2006.01)
*B66F 9/075* (2006.01)
*F16M 13/02* (2006.01)

(52) U.S. Cl.
CPC ....... *B66F 9/07504* (2013.01); *F16M 13/022* (2013.01)

(58) Field of Classification Search
CPC .................. B66F 9/07504; B66F 9/07545; F16M 13/022
See application file for complete search history.

(56) References Cited

U.S. PATENT DOCUMENTS

| 2,643,740 | A | 6/1953 | Quayle |
| 3,576,333 | A | 4/1971 | Danielson et al. |
| 3,797,793 | A | 3/1974 | Wilson et al. |

(Continued)

FOREIGN PATENT DOCUMENTS

| CN | 103922243 A | 7/2014 |
| DE | 9111815 U1 | 1/1992 |

(Continued)

OTHER PUBLICATIONS

RAM "Lager & Logistik RAM Mounts Logistik RAM Mounts Ram Mounst Germany GmbH"; Sep. 1, 2016; XP055912768; retrieved from the internet Apr. 13, 2022; URL:https://jfuehr.com/medienverwaltung/medien/DL_RAM_Lager_und_Logistik2016.pdf.

(Continued)

*Primary Examiner* — Amy J. Sterling
(74) *Attorney, Agent, or Firm* — Stevens & Showalter LLP

(57) ABSTRACT

A work assist system is provided for an industrial vehicle. The work assist system includes a support structure having a portion including a predefined cross-sectional shape. The work assist system further includes a clamp member having coupling structure for removably coupling the clamp member to the support structure portion, and mounting structure that removably supports a work assist item that is usable by an operator located in an operator compartment of the vehicle.

15 Claims, 13 Drawing Sheets

(56) References Cited

U.S. PATENT DOCUMENTS

| | | | |
|---|---|---|---|
| 3,948,537 | A | 4/1976 | Black |
| 4,127,196 | A | 11/1978 | Boucher |
| 4,388,037 | A | 6/1983 | Suarez |
| 4,589,669 | A | 5/1986 | Kedem |
| 4,595,163 | A | 6/1986 | Guggiari |
| 4,884,936 | A | 12/1989 | Kawada |
| D320,592 | S | 10/1991 | Straka |
| 5,245,144 | A | 9/1993 | Stammen |
| 5,388,661 | A | 2/1995 | Hood, Jr. |
| 5,464,183 | A | 11/1995 | McConnell et al. |
| 5,636,776 | A | 6/1997 | Rak et al. |
| 5,683,063 | A | 11/1997 | Seiders et al. |
| 5,752,584 | A | 5/1998 | Magoto et al. |
| 5,829,948 | A | 11/1998 | Becklund |
| 6,076,937 | A | 6/2000 | Wood et al. |
| 6,113,047 | A | 9/2000 | Wung et al. |
| 6,174,124 | B1 | 1/2001 | Haverfield et al. |
| 6,347,489 | B1 | 2/2002 | Marshall, Jr. |
| 6,464,025 | B1 | 10/2002 | Koeper et al. |
| 6,511,080 | B2 | 1/2003 | Lee |
| 6,561,469 | B1 | 5/2003 | Masuda et al. |
| 6,575,419 | B1 | 6/2003 | Masuda et al. |
| 6,662,983 | B2 | 12/2003 | Lane et al. |
| 6,883,625 | B2 | 4/2005 | Trego et al. |
| 6,929,224 | B1 | 8/2005 | Masuda et al. |
| 6,948,739 | B2 | 9/2005 | Gallagher et al. |
| 7,097,082 | B2 | 8/2006 | Wallaker |
| 7,325,777 | B2 | 2/2008 | Thiessen |
| 7,353,817 | B2 | 4/2008 | Kobel |
| D570,185 | S | 6/2008 | Hanes |
| D571,184 | S | 6/2008 | Ricereto |
| D573,868 | S | 7/2008 | Ricereto |
| D579,534 | S | 10/2008 | Genord et al. |
| 7,472,945 | B2 | 1/2009 | Miura |
| 7,537,258 | B2 | 5/2009 | Quijano et al. |
| 7,641,020 | B2 | 1/2010 | Lohmann |
| 8,038,110 | B2 | 10/2011 | Talbott |
| 8,358,279 | B2 | 1/2013 | Han et al. |
| 8,448,959 | B1 | 5/2013 | Pohot |
| D695,206 | S | 12/2013 | Eriksson |
| 8,646,826 | B2 | 2/2014 | Wihinen et al. |
| D717,631 | S | 11/2014 | Elbl |
| D717,632 | S | 11/2014 | Elbl |
| D719,008 | S | 12/2014 | Han |
| 8,905,183 | B2 | 12/2014 | Warner et al. |
| 8,944,395 | B2 | 2/2015 | Bonito et al. |
| 9,027,898 | B1 | 5/2015 | Holmboe |
| 9,035,208 | B2 | 5/2015 | Warner et al. |
| 9,095,946 | B2 | 8/2015 | Kotula et al. |
| 9,249,003 | B2 | 2/2016 | Reeves |
| 9,403,271 | B2 | 8/2016 | Blake |
| 9,663,338 | B1 | 5/2017 | James et al. |
| 9,808,266 | B2 | 11/2017 | Ray et al. |
| 9,851,048 | B2 | 12/2017 | Higgins |
| 9,988,186 | B1 | 6/2018 | Johnson |
| D823,229 | S | 7/2018 | Chiang |
| 10,053,856 | B2 | 8/2018 | Haddock |
| 10,252,683 | B2 | 4/2019 | Molnar et al. |
| D856,628 | S | 8/2019 | Molnar et al. |
| 10,414,038 | B2 | 9/2019 | Wasylow |
| 10,618,383 | B2 | 4/2020 | Luo |
| 11,447,378 | B2 | 9/2022 | Huddleston et al. |
| 11,660,739 | B1* | 5/2023 | Coffey .................... E04G 5/003 206/373 |
| 11,866,310 | B2 | 1/2024 | Otto et al. |
| 2003/0173476 | A1 | 9/2003 | Masuda et al. |
| 2003/0197351 | A1 | 10/2003 | Burger et al. |
| 2006/0186155 | A1 | 8/2006 | Quijano et al. |
| 2006/0243517 | A1 | 11/2006 | Lohmann |
| 2007/0262221 | A1 | 11/2007 | Schroder |
| 2009/0045303 | A1* | 2/2009 | Andkjar ................ F16M 11/10 248/178.1 |
| 2012/0235804 | A1 | 9/2012 | Gilbride et al. |
| 2012/0298539 | A1 | 11/2012 | Purnell, Jr. |
| 2014/0183844 | A1 | 7/2014 | Iryami |
| 2014/0219758 | A1 | 8/2014 | Soder et al. |
| 2014/0219759 | A1 | 8/2014 | Soder et al. |
| 2014/0219760 | A1 | 8/2014 | Soder et al. |
| 2015/0001359 | A1 | 1/2015 | Catchings |
| 2015/0217702 | A1 | 8/2015 | Jacobsthal et al. |
| 2017/0072870 | A1 | 3/2017 | Brotherton et al. |
| 2017/0166059 | A1 | 6/2017 | Inagaki et al. |
| 2017/0225627 | A1 | 8/2017 | Molnar et al. |
| 2018/0044909 | A1 | 2/2018 | Haddock |
| 2019/0078730 | A1* | 3/2019 | Braun ...................... B60R 1/06 |
| 2021/0301483 | A1 | 9/2021 | Stancescu |
| 2021/0338537 | A1 | 11/2021 | Mitamura et al. |
| 2022/0242709 | A1 | 8/2022 | Otto et al. |

FOREIGN PATENT DOCUMENTS

| | | |
|---|---|---|
| DE | 9404515 U1 | 5/1994 |
| DE | 9408682 U1 | 12/1994 |
| DE | 29909917 U1 | 10/1999 |
| DE | 10057402 A1 | 5/2001 |
| DE | 20220363 U1 | 7/2003 |
| DE | 10332889 A1 | 2/2005 |
| DE | 10160302 B4 | 6/2010 |
| DE | 102010026383 A1 | 1/2012 |
| DE | 102015105689 A1 | 10/2016 |
| EP | 0655413 A1 | 5/1995 |
| EP | 0717005 A1 | 6/1996 |
| EP | 1205429 A1 | 5/2002 |
| EP | 1690820 A1 | 8/2006 |
| EP | 1870319 B1 | 11/2010 |
| EP | 2384955 A2 | 11/2011 |
| EP | 2199156 B1 | 2/2012 |
| EP | 2602224 A1 | 6/2013 |
| EP | 2444287 B1 | 8/2013 |
| EP | 2402235 B1 | 8/2016 |
| EP | 2636815 B1 | 3/2018 |
| EP | 3333119 A1 | 6/2018 |
| FR | 2777524 A1 | 10/1999 |
| GB | 643302 A | 9/1950 |
| GB | 2292730 A | 3/1996 |
| JP | S58168975 U | 11/1983 |
| JP | S63162792 U | 10/1988 |
| JP | 2005231820 A | 9/2005 |
| WO | 9625300 A1 | 8/1996 |
| WO | 9631431 A1 | 10/1996 |
| WO | 2019203388 A1 | 10/2019 |

OTHER PUBLICATIONS

Anonymous "RAM Mounts & Material Handling: 2018 Catalog and Popular Solutions / RAM Mounts Blog"; Apr. 17, 2018; pp. 1-3; XP055912764; retrieved from the internet Apr. 13, 2022; URL:https://www.rammount.com/blog/2018/04/material-handling-2018-catalog-and-popular-solutions/.

Erbel, Christoph; International Search Report and Written Opinion dated May 15, 2017; International Application No. PCT/US2017/016912; European Patent Office; Rijswijk, Netherlands.

Wittmann-Regis, Agnes; International Preliminary Report on Patentability dated Aug. 23, 2018; International Application No. PCT/US2017/016912; International Bureau of WIPO; Geneva, Switzerland.

Molnar, Christan; Notice of Allowance dated Nov. 29, 2018; U.S. Appl. No. 15/427,360; United States Patent and Trademark Office; Alexandria, Virginia.

Molnar, Christan; Notice of Allowance dated Mar. 20, 2019; Design U.S. Appl. No. 29/599,392; United States Patent and Trademark Office; Alexandria, Virginia.

Sheppard, Bruce; International Search Report and Written Opinion dated May 3, 2022; International Application No. PCT/US2022/013641; European Patent Office; Rijswijk, Netherlands.

Vanaman, Frank; Office Action dated Sep. 7, 2004; U.S. Appl. No. 10/421,090; United States Patent and Trademark Office; Alexandria, Virginia.

Vanaman, Frank; Final Office Action dated Feb. 17, 2005; U.S. Appl. No. 10/421,090; United States Patent and Trademark Office; Alexandria, Virginia.

(56) References Cited

OTHER PUBLICATIONS

Burger, Jeffrey R.; Office Action dated Jul. 21, 2005; U.S. Appl. No. 10/421,090; United States Patent and Trademark Office; Alexandria, Virginia.
Burger, Jeffrey R.; Final Office Action dated Jan. 10, 2006; U.S. Appl. No. 10/421,090; United States Patent and Trademark Office; Alexandria, Virginia.
Molnar, Christian; Office Action dated May 4, 2018; U.S. Appl. No. 15/427,360; United States Patent and Trademark Office; Alexandria, Virginia.
Baharlou, Simin; International Preliminary Report on Patentability dated Jul. 31, 2023; International Application No. PCT/US2022/013641; The International Bureau of WIPO; Geneva, Switzerland.
Sterling, Amy Jo; Non-Final Rejection dated Jan. 13, 2023; U.S. Appl. No. 17/648,846; United States Patent and Trademark Office; Alexandria, Virginia.
Sterling, Amy Jo; Final Rejection dated Jun. 1, 2023; U.S. Appl. No. 17/648,846; United States Patent and Trademark Office; Alexandria, Virginia.
Sterling, Amy Jo; Notice of Allowance and Fees Due dated Aug. 29, 2023; U.S. Appl. No. 17/648,846; United States Patent and Trademark Office; Alexandria, Virginia.
Sterling, Amy Jo; Corrected Notice of Allowability dated Dec. 6, 2023; U.S. Appl. No. 17/648,846; United States Patent and Trademark Office; Alexandria, Virginia.

\* cited by examiner

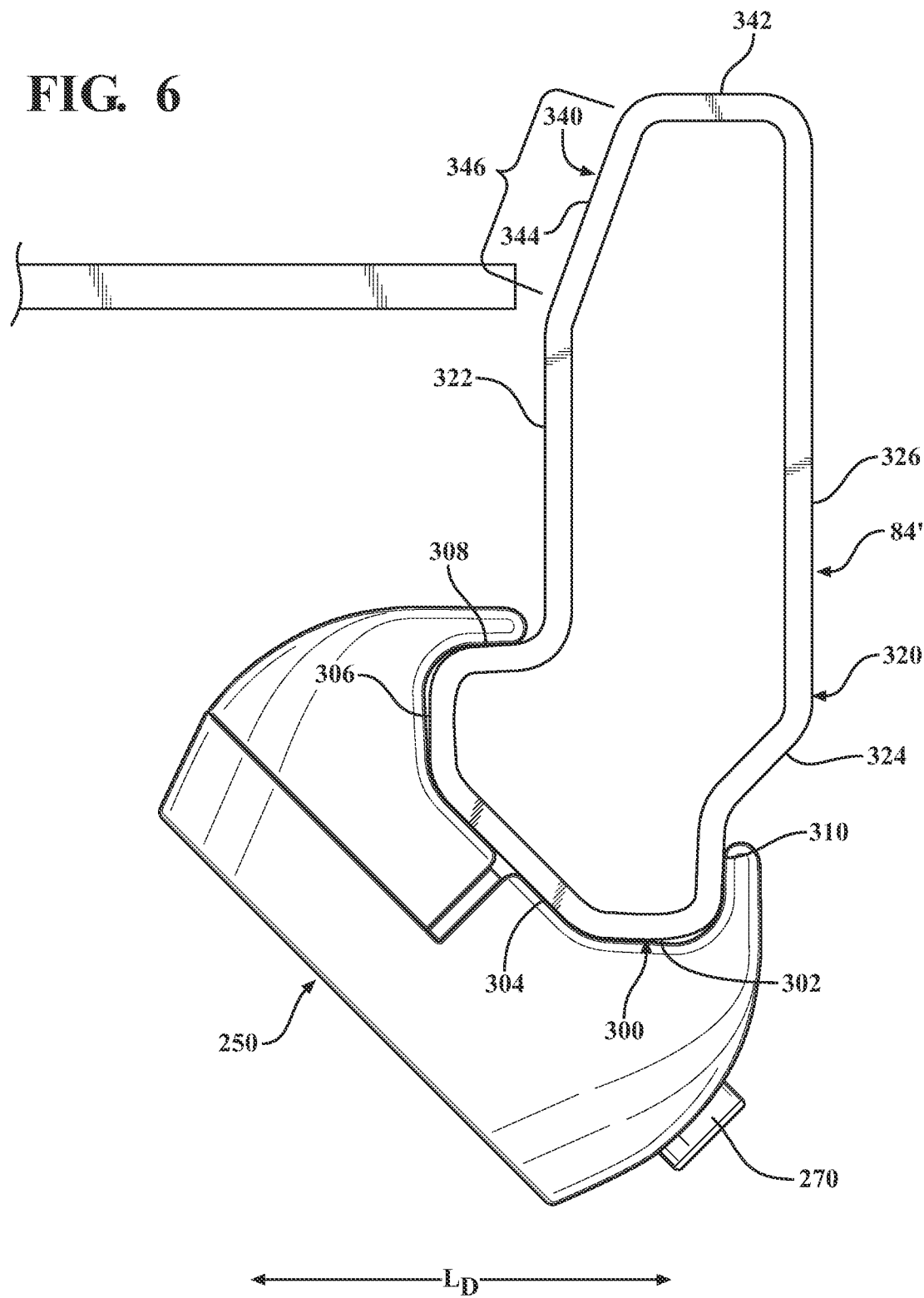

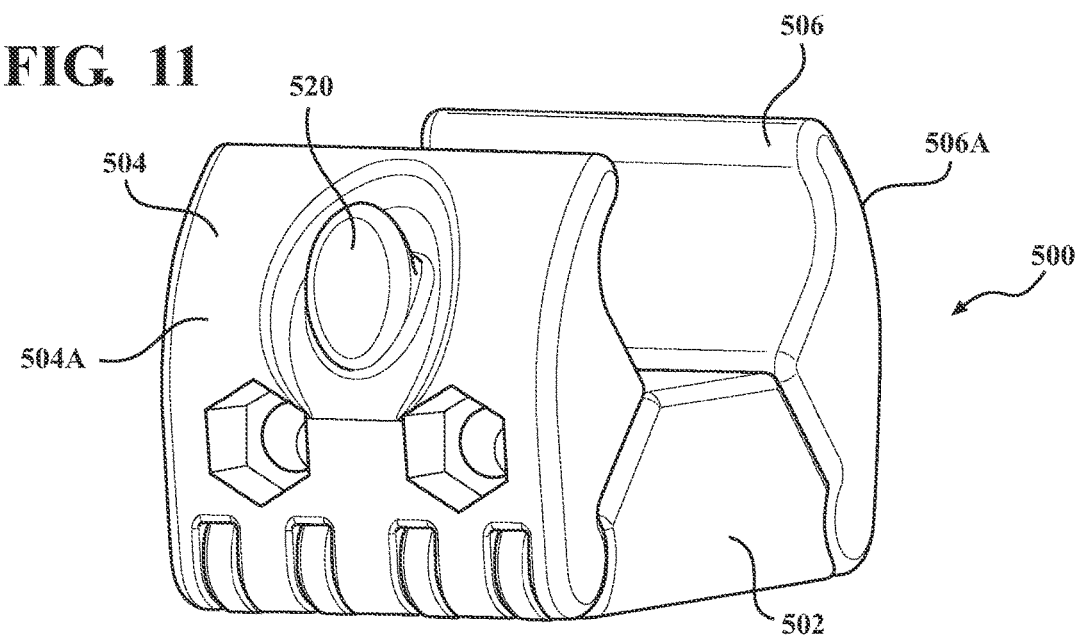
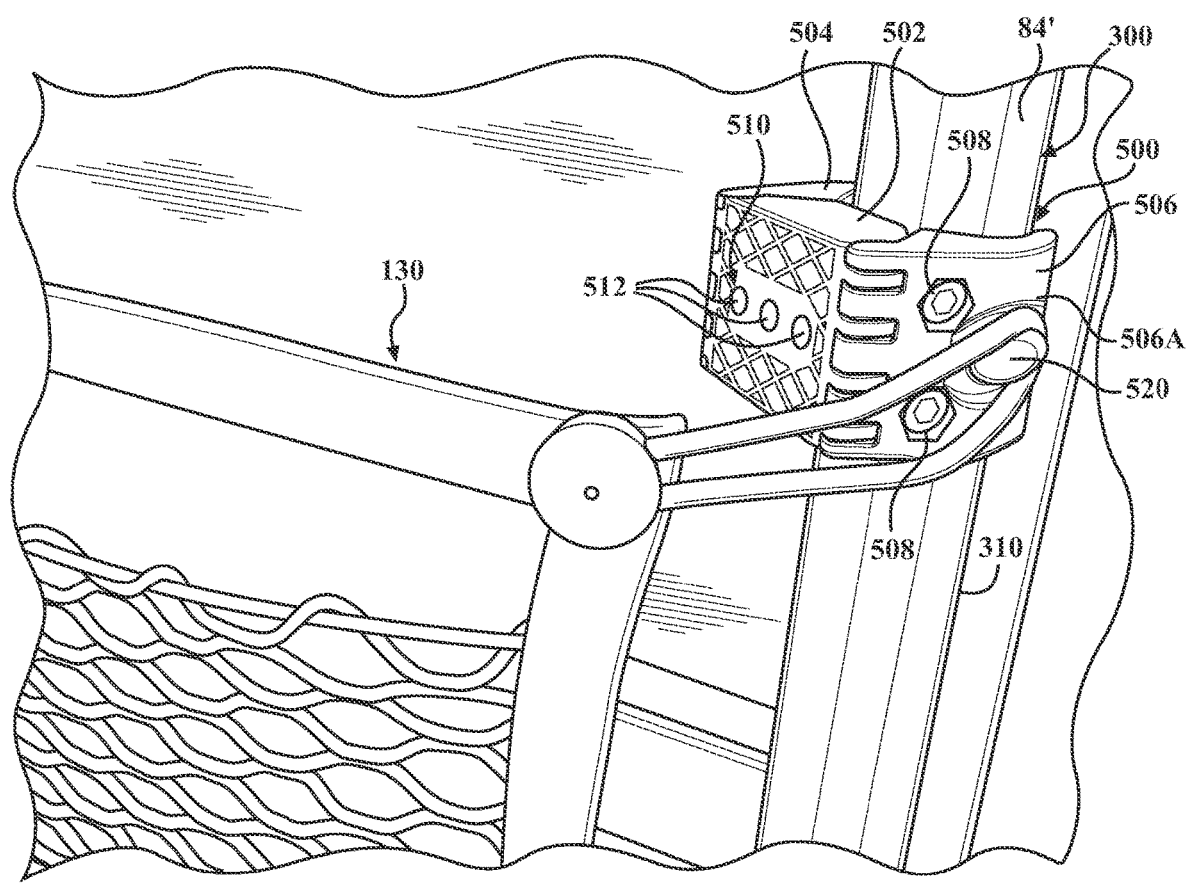

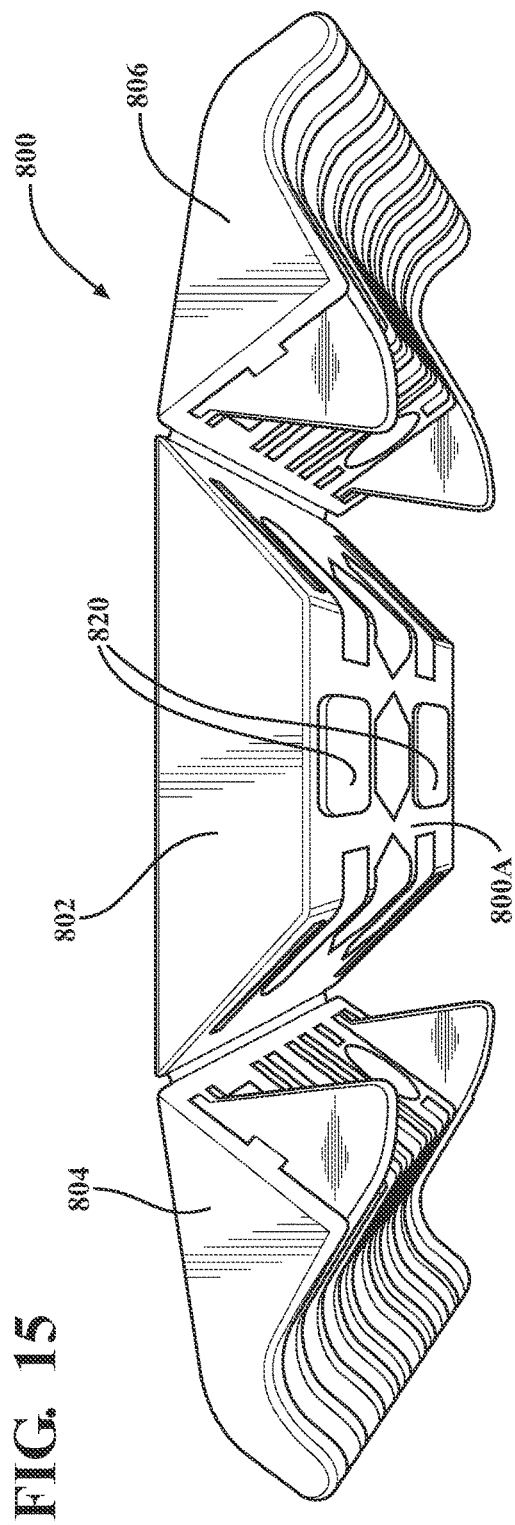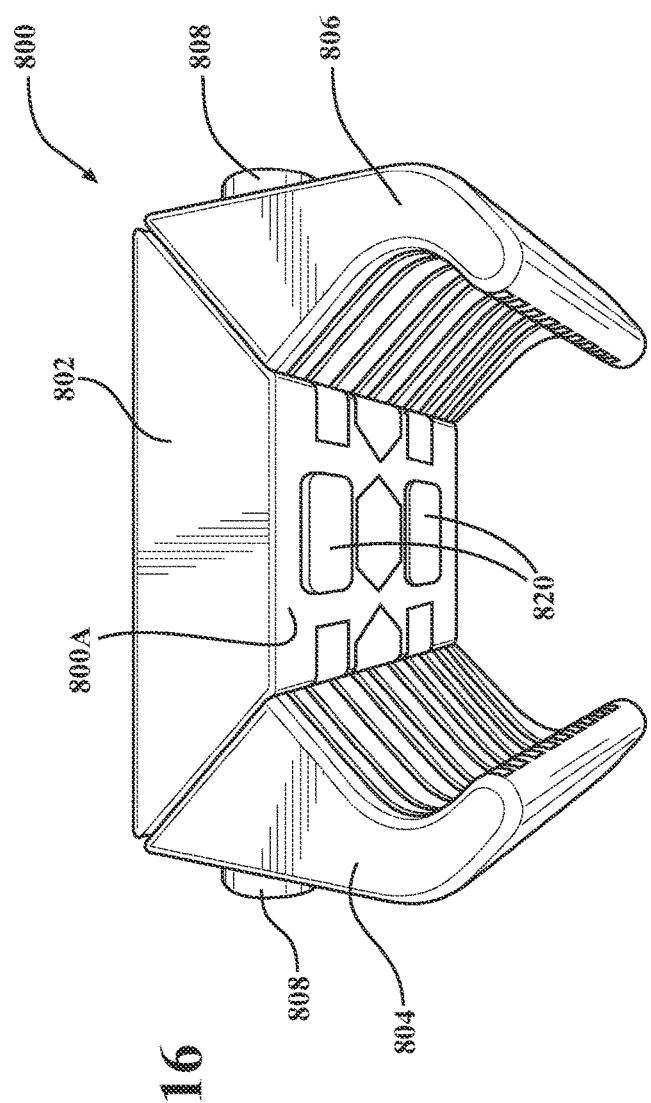

WORK ASSIST SYSTEM FOR AN INDUSTRIAL VEHICLE

CROSS REFERENCE TO RELATED APPLICATIONS

This application is a continuation of U.S. patent application Ser. No. 17/648,846, filed Jan. 25, 2022, entitled "WORK ASSIST SYSTEM FOR AN INDUSTRIAL VEHICLE", which claims the benefit of U.S. Provisional Patent Application Ser. No. 63/143,351, filed Jan. 29, 2021, entitled "WORK ASSIST SYSTEM FOR AN INDUSTRIAL VEHICLE", the entire disclosures of which are hereby incorporated by reference herein.

FIELD

A work assist system is provided for a materials handling vehicle, the work assist system comprising a clamp member including coupling structure for removably coupling the clamp member to a component of the vehicle, and mounting structure that removably supports a work assist item.

BACKGROUND

Known materials handling vehicles include a power unit, a mast assembly, and an operator compartment. The mast assembly may include a plurality of mast weldments, wherein a first mast weldment may be fixed to the power unit and one or more other mast weldments may be supported for telescoping movement. An operator sits or stands in the operator compartment to operate the vehicle.

SUMMARY

In accordance with a first aspect of the disclosure, a work assist system is provided for an industrial vehicle. The work assist system comprises a first support structure including a first portion having a predefined cross-sectional shape, and a clamp member. The clamp member comprises coupling structure for removably coupling the clamp member to the first support structure at the first portion, and mounting structure that removably supports a work assist item that is usable by an operator located in an operator compartment of the vehicle.

The first support structure may be a vertical post, which may support an overhead guard of the vehicle. The vehicle defines an operator working position from which an operator operates the vehicle, and the first support structure may be visually aligned, from the operator working position, with a vertical first beam of a mast assembly of the vehicle. The operator working position may be generally centered in a lateral direction between the first beam of the mast assembly and a vertical second beam of the mast assembly, the lateral direction defined between opposing left and right sides of the vehicle. The support structure may comprise a first portion proximate to the operator working position and to which the clamp member is removably coupled, and a rear portion distal from the operator working position. The rear portion may include a laterally inwardly facing side having a tapered portion that is tapered in the laterally outward direction as it extends away from the operator working position. The tapered portion may be generally parallel to a plane extending from the operator working position to the tapered portion.

The predefined cross-sectional shape may be defined by a first portion of the support structure proximate to an operator working position from which an operator operates the vehicle, wherein the clamp member is removably coupled to the first portion.

The work assist system may further comprise a second support structure including a second portion having the same predefined cross-sectional shape as the first support structure, wherein the clamp member can be removably coupled to either the first portion of the first support structure or the second portion of the second support structure. The first and second support structures may be different types of structures, e.g., the first support structure may comprise a vertical post and the second support structure may comprise a horizontal beam. Or, the first and second support structures may be first and second vertical posts, which may support an overhead guard of the vehicle.

The vehicle defines an operator working position from which an operator operates the vehicle, wherein the first vertical post may be visually aligned, from the operator working position, with a vertical first beam of a mast assembly of the vehicle, and the second vertical post may be visually aligned, from the operator working position, with a vertical second beam of the mast assembly. The operator working position may be generally centered in a lateral direction between the vertical first beam of the mast assembly and the vertical second beam of the mast assembly, the lateral direction defined between opposing left and right sides of the vehicle. The predefined cross-sectional shape of each of the first and second portions of the respective first and second vertical posts may include a first portion proximate to the operator working position, wherein the clamp member may be selectively removably coupled to the first vertical post or the second vertical post at its first portion. The first and second vertical posts may each further include a rear portion distal from the operator working position, the rear portion including a laterally inwardly facing side having a tapered portion that is tapered in the laterally outward direction as it extends away from the operator working position. The tapered portion of the first vertical post may be generally parallel to a plane extending from the operator working position to the tapered portion of the first vertical post, and the tapered portion of the second vertical post may be generally parallel to a plane extending from the operator working position to the tapered portion of the second vertical post.

The first support structure may be a horizontal beam located in an overhead guard of the vehicle.

The clamp member may further comprise one or more non-skid surfaces located on a surface of the clamp member that engages the first support structure when the clamp member is coupled to the first support structure.

BRIEF DESCRIPTION OF THE DRAWINGS

FIG. 6 is a cross sectional view of a support structure and illustrating a clamp member according to embodiments;

FIG. 11 is a perspective view of a clamp member according to embodiments;

FIG. 12 is a perspective view of the clamp member of FIG. 11 shown attached to a support structure of an industrial vehicle;

FIGS. 15 and 16 are perspective views of a clamp member according to embodiments.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Figure 1:
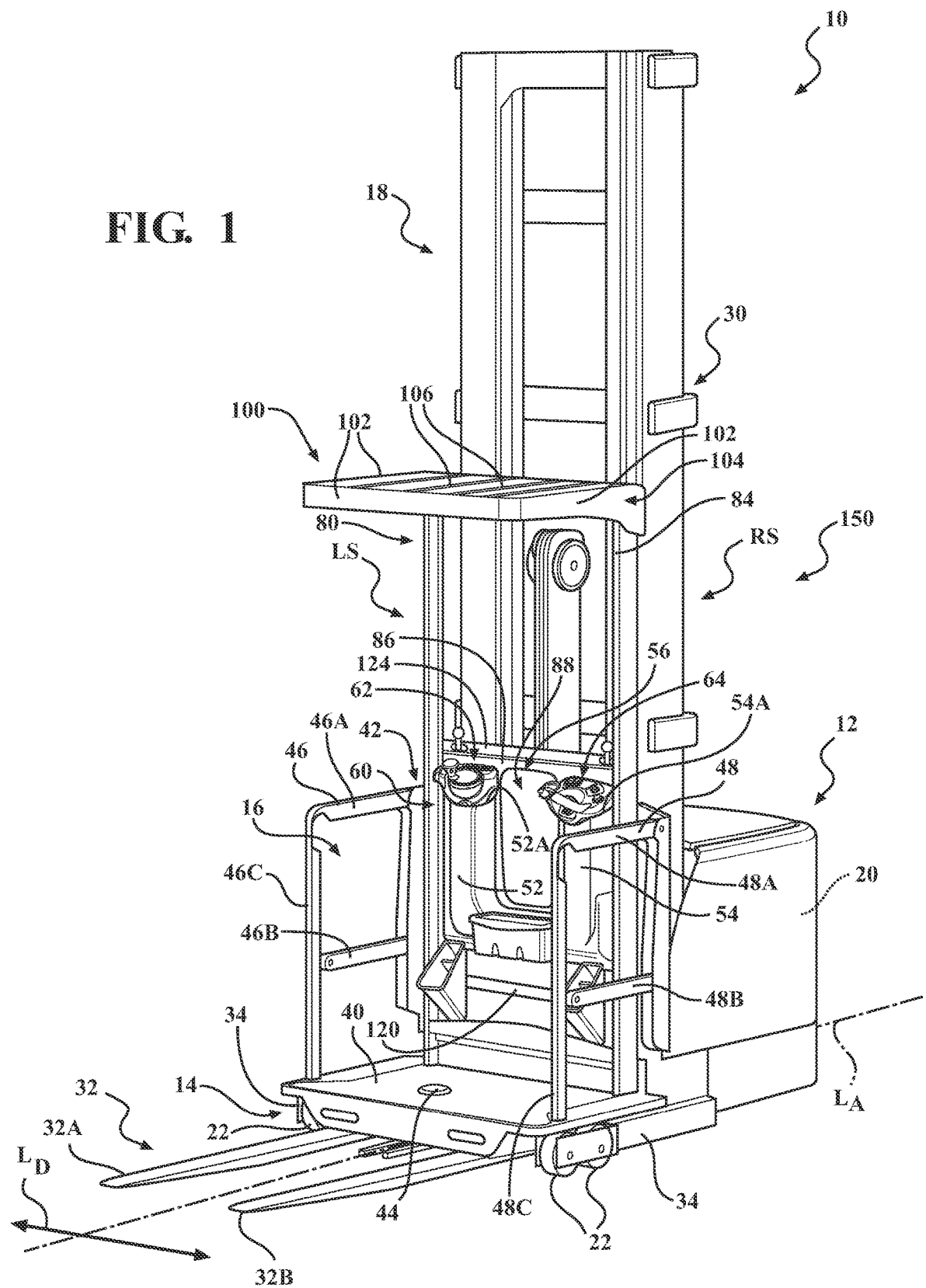
FIG. 1 is a perspective view of an industrial vehicle including a work assist system according to embodiments.

Referring now to the drawings, FIG. 1 illustrates an industrial vehicle 10 constructed in accordance with embodiments. In the illustrated embodiment, the vehicle 10 comprises a stockpicker, but could be another type of industrial vehicle. The vehicle 10 includes a power unit 12 and a load handling assembly 18. The power unit 12 includes a power source, such as a battery unit 20. The vehicle 10 includes a plurality of wheels 22 on which the vehicle 10 travels (one or more additional wheels are located underneath the power unit 12 but are not shown in FIG. 1). The load handling assembly 18 comprises a platform assembly 14, including an operator compartment 16, a mast assembly 30 coupled to the power unit 12 on which the platform assembly 14 moves vertically, and fork structure 32 comprising a pair of forks 32A, 32B. The mast assembly 30 comprises one or more mast sections, each mast section including a pair of spaced apart vertical beams. The exemplary mast assembly 30 illustrated in FIG. 1 is a three-stage mast assembly, in which a primary mast section to which the platform assembly 14 is attached is raised until it contacts the top of a third stage mast section, which causes hydraulic pressure in the mast assembly 30 to shift such that a second stage mast section begins to raise. The second stage mast section is connected to a first stage mast section and the third stage mast section with a chain. The first stage mast section is fixed to the power unit 12 and to a pair of outriggers 34 that each support one or more of the wheels 22. As the second stage mast section is raised, the third stage mast section raises twice the distance.

The operator compartment 16 includes a floor surface 40 upon which an operator stands while operating the vehicle 10 from an operator station 42 located in the operator compartment 16. An operator presence sensor 44 in the form of a pressure switch that senses an operator's foot is provided in the floor surface 40. According to embodiments, one or more functions of the vehicle, such as traveling movement, raising/lowering the load handling assembly 18, etc. may be disabled unless the operator presence sensor 44 indicates the presence of the operator in the operator compartment 16. Alternate devices, such as sensors, switches, etc., may be used to detect the presence of the operator in the operator compartment 16 as desired.

First and second side restraints 46, 48 are provided at opposed left and right sides LS, RS of the vehicle 10 at the operator compartment 16, the left and right sides LS, RS being spaced apart from one another in a lateral direction LD that is perpendicular to a longitudinal axis LA of the vehicle 10. The first and second side restraints 46, 48 respectively comprise support structures in the form of horizontal guard bars 46A, 46B, 48A, 48B and vertical guard bars 46C, 48C. Any number of horizontal and vertical guard bars may be used to form the first and second side restraints 46, 48.

The operator compartment 16 further comprises a first support column 52 and a second support column 54 spaced apart from each other in the lateral direction LD, as shown in FIG. 1. The first and second support columns 52, 54 are separated by a recessed portion 56 of the vehicle 10 that defines an open area extending downward from upper surfaces 52A, 54A of the first and second support columns 52, 54 toward the floor surface 40.

An operator control system 60 is provided in the operator station 42, wherein the operator uses the operator control system 60 to drive the vehicle 10 and to control additional vehicle functions. The exemplary operator control system 60 depicted in FIG. 1 comprises a first operator control assembly 62 supported on the first support column 52 and a second operator control assembly 64 supported on the second support column 54. In the illustrated embodiment, the first operator control assembly 62 is provided to control steering of the vehicle 10 and one or more additional vehicle functions, and the second operator control assembly 64 is provided to control load handling assembly lift and lower functions and other vehicle functions.

Figure 2:
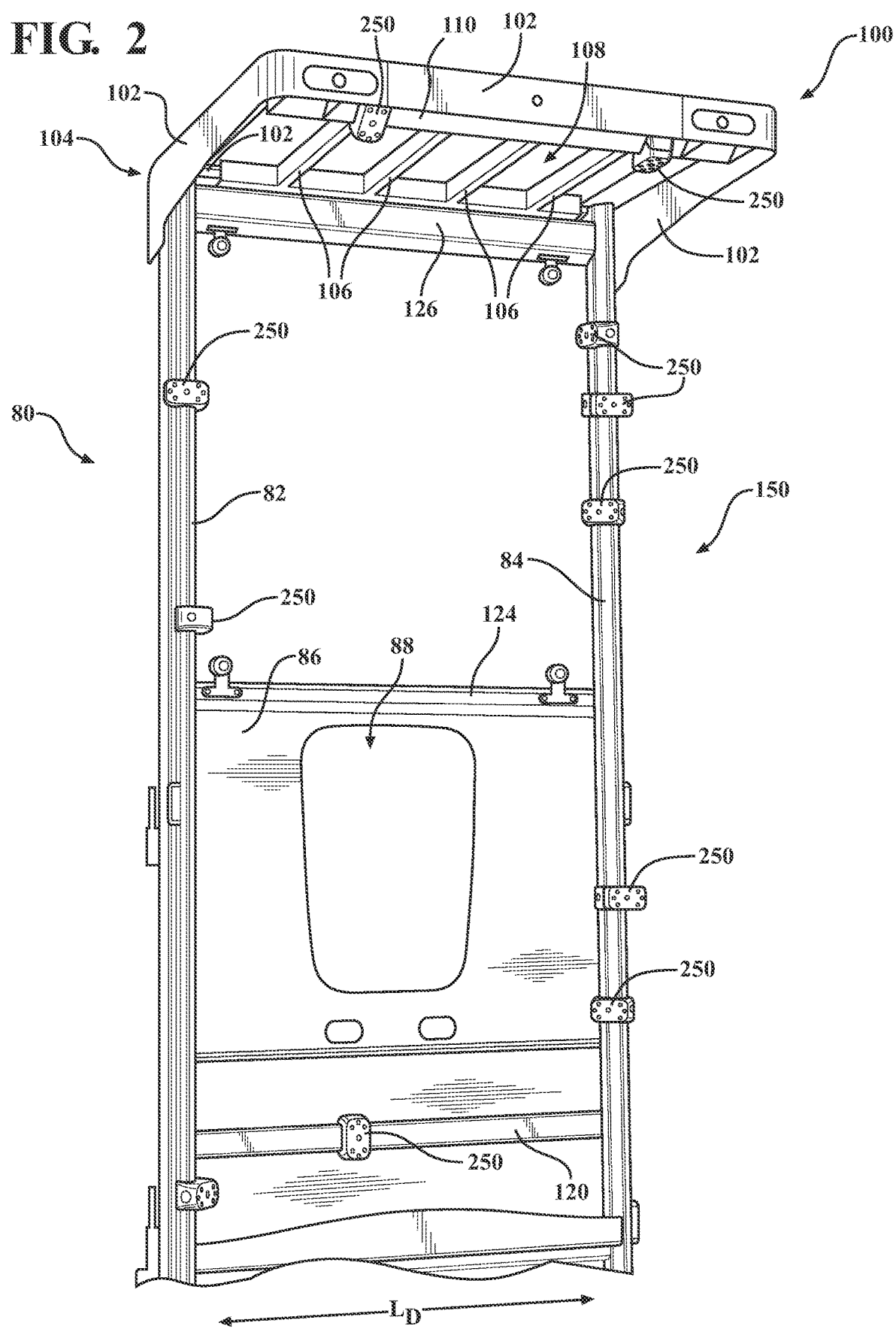
FIG. 2 is a perspective view of an upright assembly and overhead guard of the vehicle of FIG. 1.

With reference to FIGS. 1 and 2, the vehicle 10 further includes an upright assembly 80 comprising a first support structure in the form of a first vertical post 82 and a second support structure in the form of a second vertical post 84. The first and second vertical posts 82, 84 are spaced apart from one another in the lateral direction LD and are located on the opposed left and right sides LS, RS of the vehicle 10. The upright assembly 80 further includes a panel 86 that spans between the first and second vertical posts 82, 84. The panel 86 may include a visibility opening 88 in the recessed portion 56. A window or mesh structure (not shown) may be provided in the visibility opening 88.

The first and second vertical posts 82, 84 support an overhead guard 100 of the vehicle 10. The overhead guard 100 comprises a plurality of support structures in the form of a plurality of first beams 102 that define an outer frame 104 of the overhead guard 100, and a plurality of second beams 106 that span between the first beams 102 in an open space 108 of the outer frame 104, see FIG. 2. The overhead guard 100 may include any number of second beams 106, which second beams 106 may extend in a direction parallel to the longitudinal axis LA of the vehicle 10 as shown in FIG. 1. The second beams 106 may extend in any direction as desired, including the lateral direction LD (see, for example, lateral beam 110 in FIG. 2), or one or more directions between the lateral direction LD and the direction parallel to the longitudinal axis LA of the vehicle 10, such as in a crisscross or mesh pattern.

One or more additional support structures in the form of beams, e.g., horizontal or vertical beams, may be located in or around the operator compartment 16. In the exemplary embodiment of FIGS. 1 and 2, a first horizontal beam 120 is affixed to the panel 86 and spans between the first and second vertical posts 82, 84. A second horizontal beam 124 is included between the first and second support columns 52, 54, and a third horizontal beam 126 spans between the first and second vertical posts 82, 84 near the overhead guard 100, see FIG. 2. Additional support structures in the form of additional beams may be located in or around the operator compartment 16 as desired.

In accordance with embodiments, the various support structures of the vehicle 10 described herein, e.g., the horizontal and vertical guard bars 46A, 46B, 48A, 48B, 46C, 48C of the first and second side restraints 46, 48, the first and second vertical posts 82, 84, the first and second beams 102, 106 of the overheard guard 100, the horizontal beams 120, 124, 126, additional support structures to be discussed below, etc., may have at least a portion with a common geometry so as to be able to support one of a plurality of work assist items 130 (see FIGS. 5A-5F) thereon with a clamp member 250, which work assist items 130 and clamp member 250 will be discussed in more detail below. These support structures, clamp members 250, and work assist items 130 are components of a work assist system 150 in accordance with embodiments.

Figure 3:
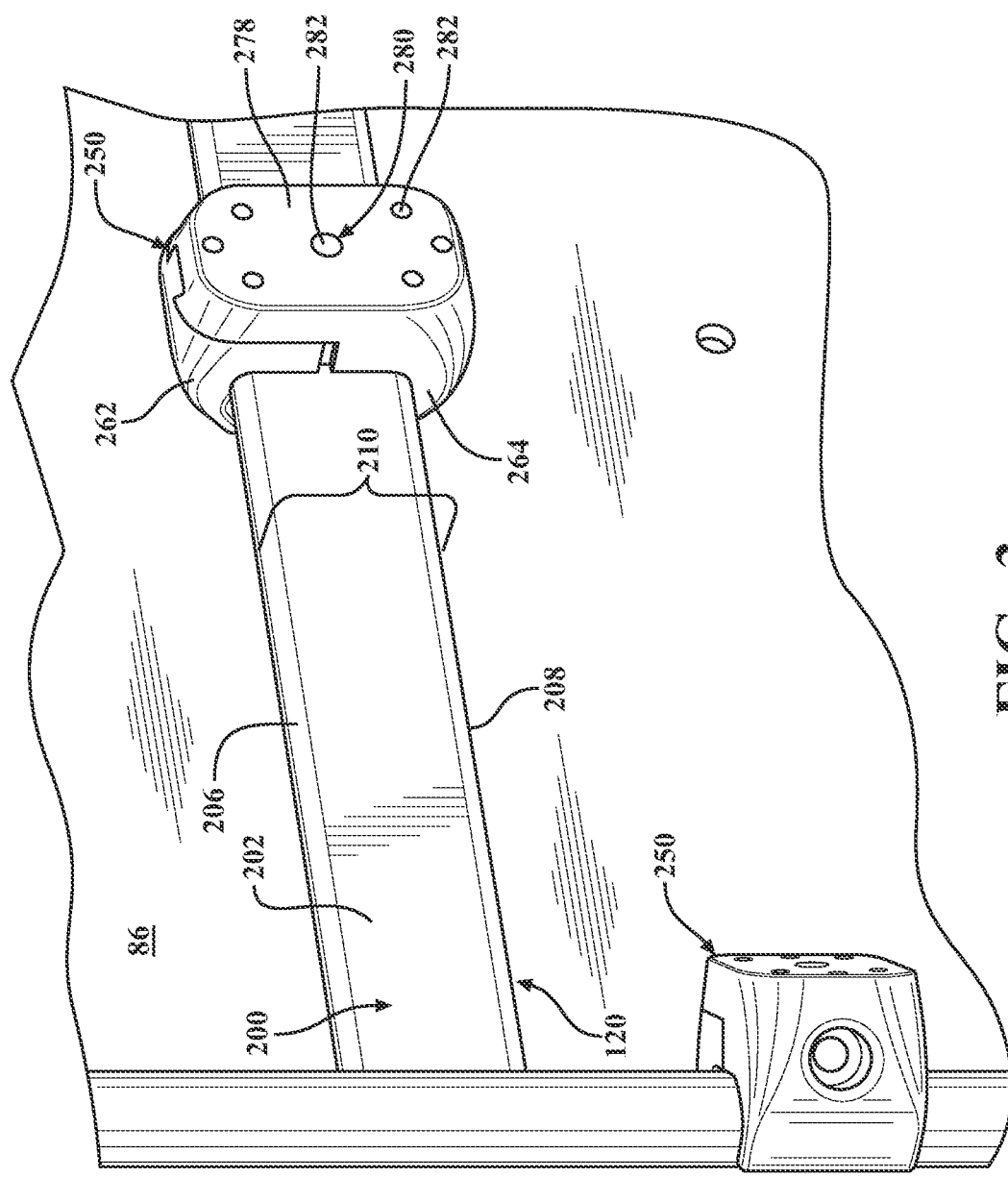
FIG. 3 is an enlarged perspective view of a portion of the vehicle of FIG. 1.
Figure 4:
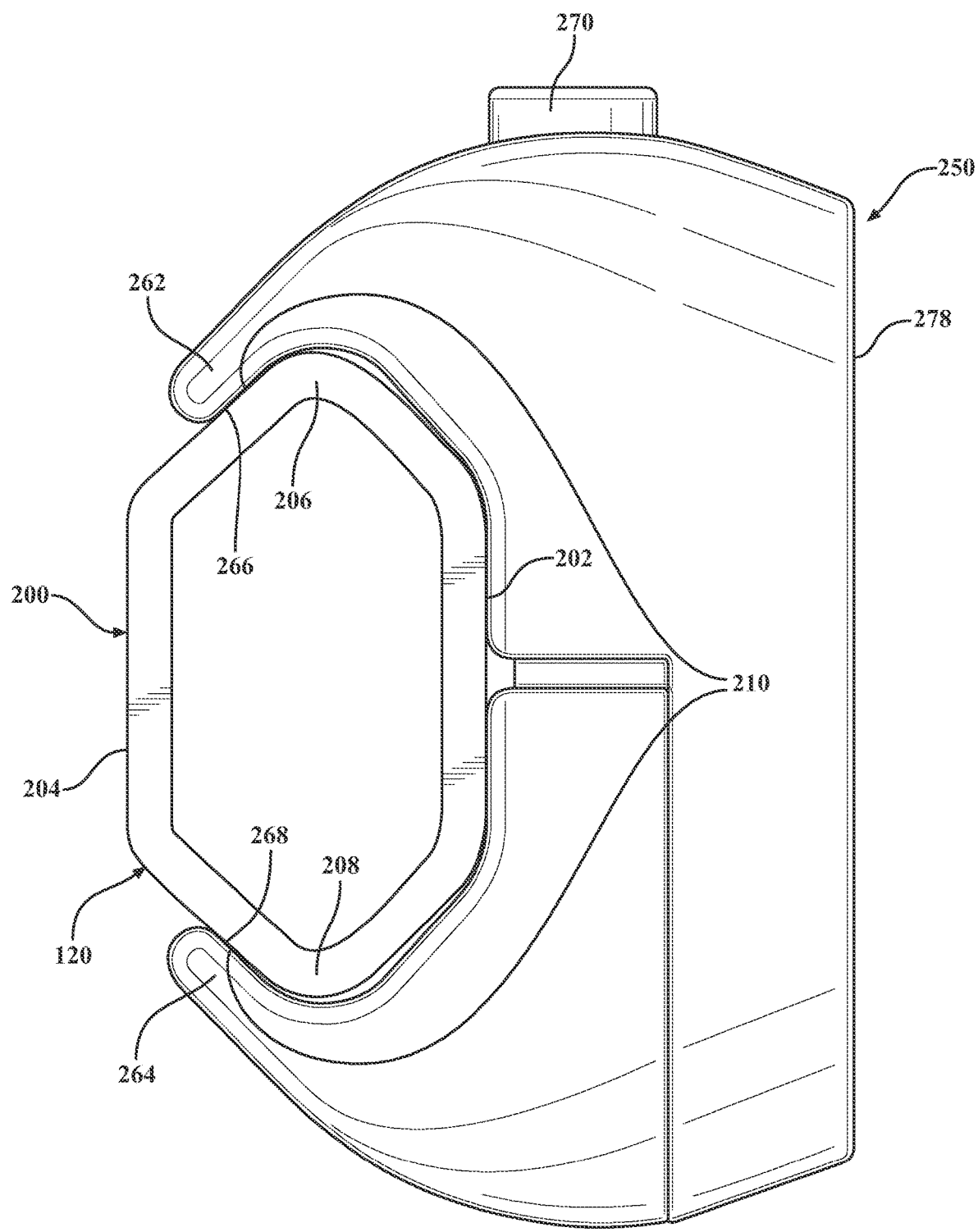
FIG. 4 is a cross sectional view of a support structure and clamp member of the work assist system of FIG. 1.
Figure 5A:
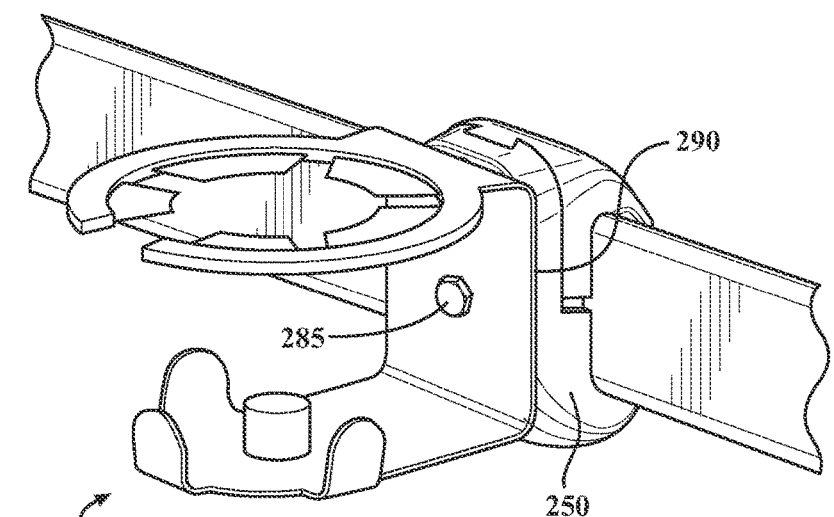
FIGS. 5A-5F are perspective views illustrating a plurality of exemplary work assist items according to embodiments.
Figure 5B:
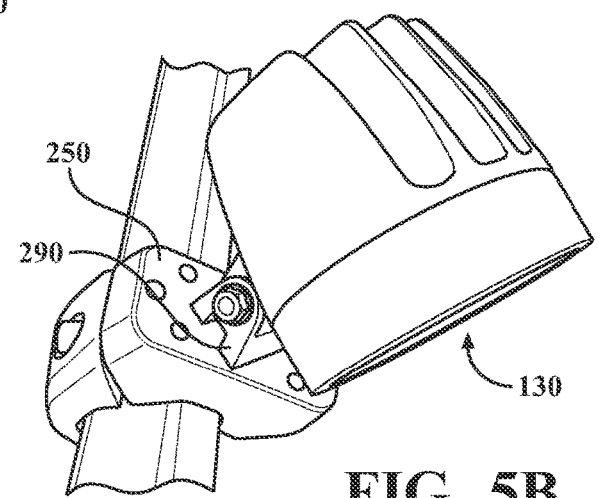
Figure 5C:
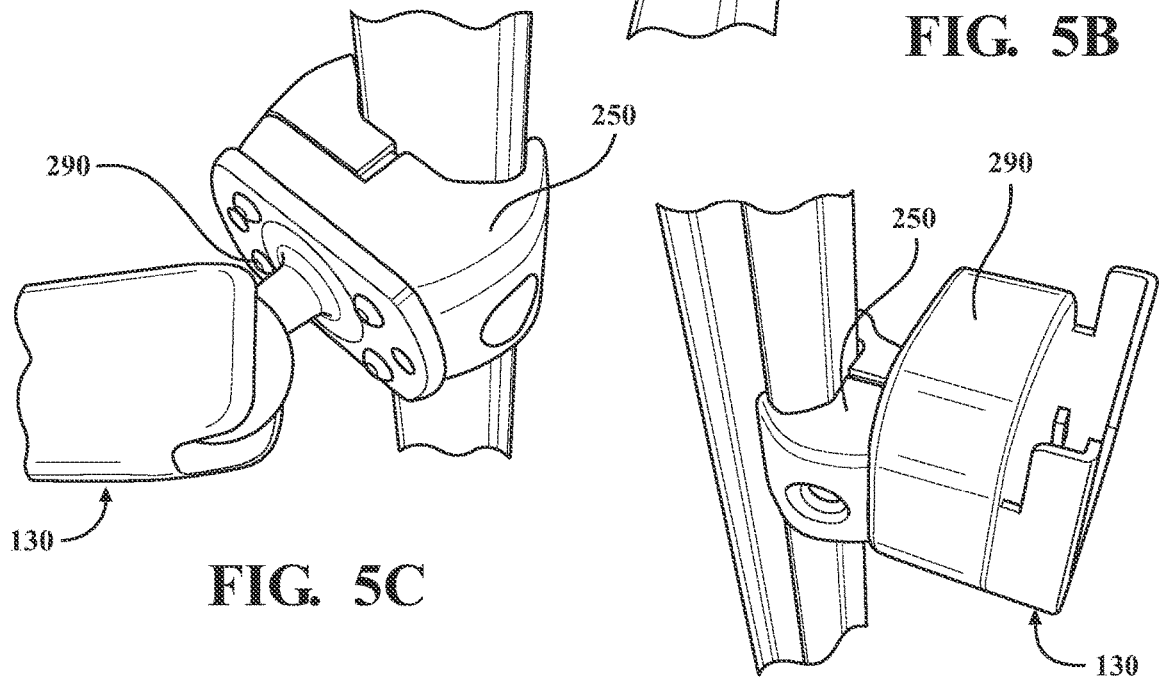
Figure 5D:
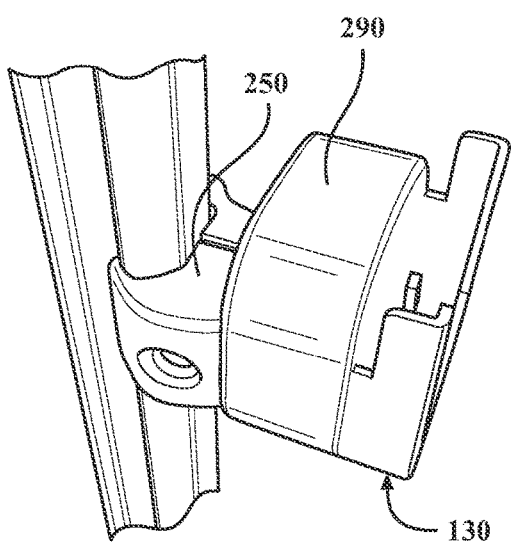
Figure 5E:
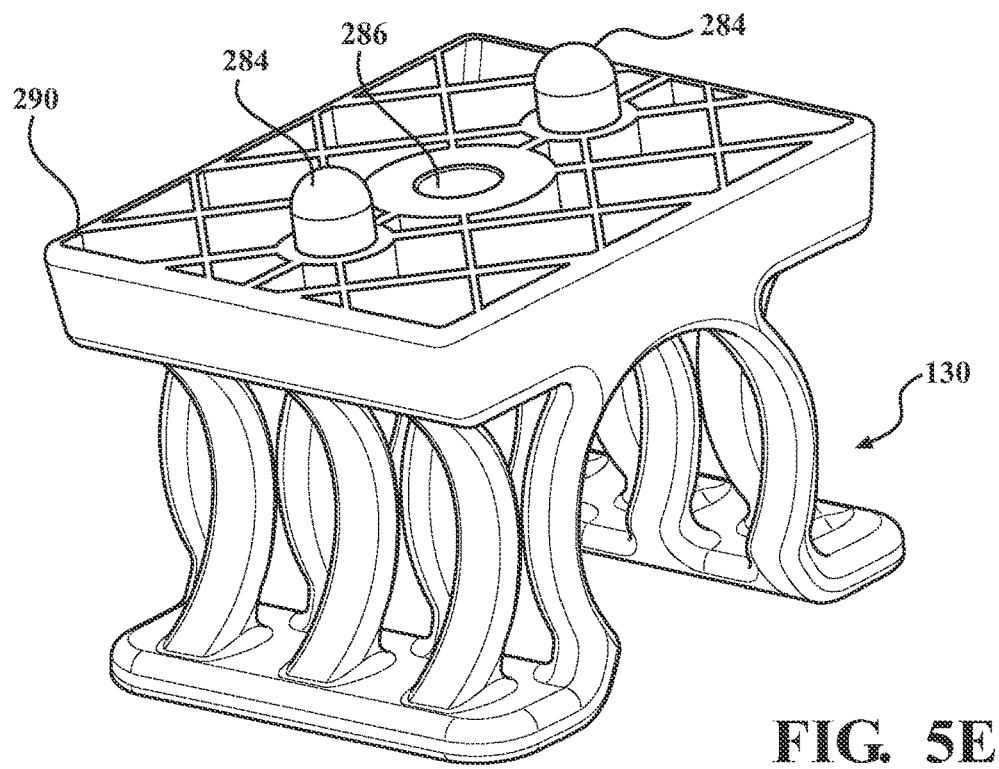
Figure 5F:
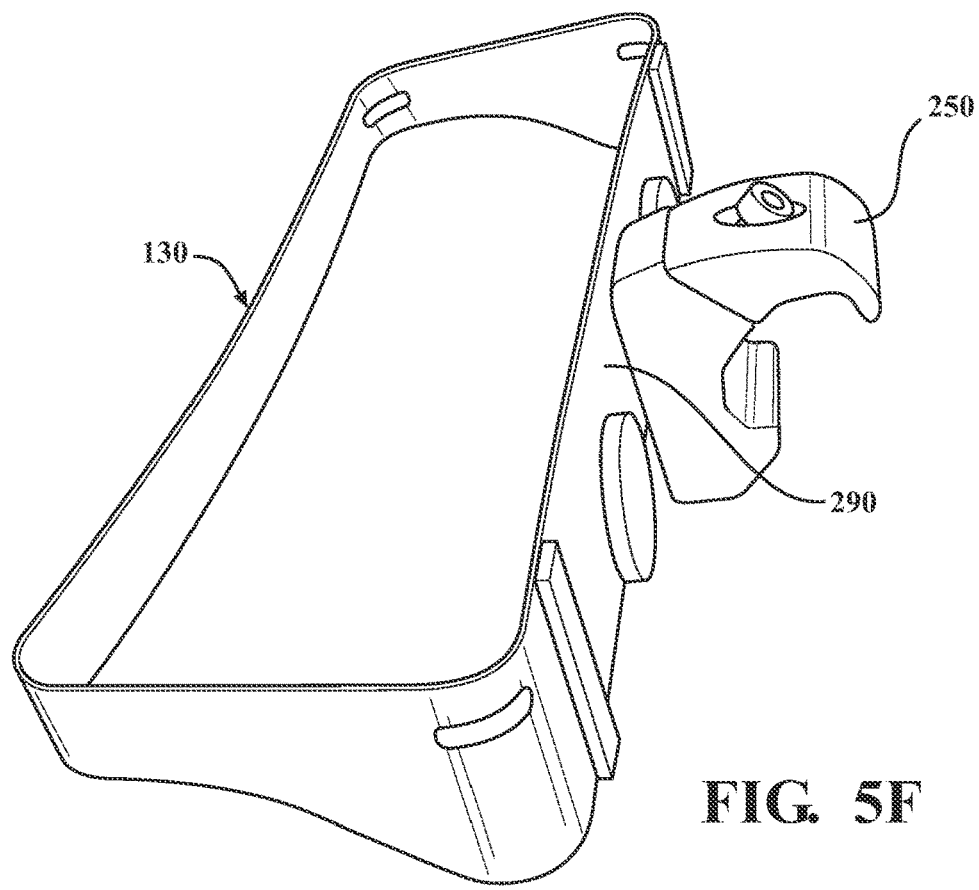

With reference to FIGS. 3 and 4, a first exemplary iteration of the common geometry of the at least a portion of the support structures is shown with reference to the first horizontal beam 120. The support structure comprises a main body portion 200. The main body portion 200 includes a generally flat front portion 202 facing away from the panel 86 of the upright assembly 80 toward the operator station 42, see FIG. 3. A back portion 204 (see FIG. 4) of the main body portion 200 of the first horizontal beam 120 may have any suitable shape and is attached to the panel 86, such as by bolting. For other ones of the support structures disclosed herein, such as the horizontal guard bars 46A, 46B, 48A, 48B, the vertical guard bars 46C, 48C, the first and second vertical posts 82, 84, and/or the first and second beams 102, 106 of the overheard guard 100, the back portion 204 of the main body portion 200 may comprise a generally flat back portion that has a similar geometry to the front portion 202, such that work assist items 130 (to be discussed below) can be supported on either side of the support structure.

The main body portion 200 further comprises a first edge portion 206 and a second edge portion 208 opposed from the first edge portion 206. In the case of a horizontal support structure such as the first horizontal beam 120, the first edge portion 206 may define an upper edge of the main body portion 200 and the second edge portion 208 may define a lower edge of the main body portion 200. If the support structure were to be a vertical support structure, such as one of the vertical guard bars 46C or 48C or the first or second vertical posts 82 or 84, the first edge portion 206 may define a first side edge of the main body portion 200 and the second edge portion 208 may define a second side edge of the main body portion 200. The first and second edge portions 206, 208 may have curved, rounded, or angled shapes that extend from the front portion 202 to the back portion 204 of the main body portion 200.

With reference to FIGS. 3 and 4, the front portion 202 and the first and second edge portions 206, 208 define a first portion 210 of the support structure proximate to an operator working position (to be discussed below), wherein the first portion 210 defines a first predefined cross-sectional shape. According to embodiments, the work assist system 150 further comprises at least one clamp member 250, wherein each clamp member 250 is capable of removably supporting one of a plurality of work assist items 130 that are usable by an operator located in the operator compartment 16 of the vehicle 10 and which are able to be removably coupled to the support structure at the first portion 210 via the clamp member 250.

The exemplary clamp member 250 shown in FIGS. 3 and 4 includes coupling structure for removably coupling the clamp member 250 to the support structure at the first portion 210. In the exemplary embodiment shown, the coupling structure comprises a pair of opposed jaw members 262, 264 that are movable with respect to one another and able to be coupled together to clamp the first portion 210 of the support structure therebetween. Each jaw member 262, 264 includes an inner surface 266, 268 that is configured to be fitted around a respective one of the first and second edge portions 206, 208 of the support structure, as shown most clearly in FIG. 4. The first and second jaw members 262, 264 are removably coupled together, e.g., using one or more securing structures such as bolts 270 that are inserted into corresponding bores (not shown in this embodiment) formed in the first and second jaw members 262, 264, to capture the support structure therebetween so as to removably couple the clamp member 250 to the first portion 210 of the support structure.

The clamp member 250 further comprises a mount member 278 including mounting structure 280 that removably supports the work assist item 130 on the support structure. The mount member 278 may be formed integral with one of the first and second jaw members 262, 264 or may be formed separately therefrom and attached to one or both of the first and second jaw members 262, 264. The mounting structure 280 comprises mounting hardware that removably supports the work assist item. In the illustrated embodiment, the mounting hardware comprises a series of openings 282, see FIG. 3, which are provided for releasably receiving corresponding projections 284 (see FIG. 5E) provided on the work assist item 130. A fastener 285 (see FIG. 5A), such as, for example, a screw or bolt, may be inserted into one of the openings 282 of the mounting structure 280 and a corresponding opening 286 formed in the work assist item 130 to removably secure the work assist item 130 to the clamp member 250. Other suitable types of mounting hardware capable of removably supporting the work assist item 130 on the clamp member 250 could also be used. It is noted that while the projections 284 and opening 286 are only visible on one of the work assist items 130 illustrated in FIG. 5E, each of the work assist items 130 may include the same or similar opening 286 and projections 284, which projections 284 are insertable into the openings 282 of the mounting structure 280.

FIGS. 5A-5F illustrate a number of exemplary work assist items 130 that could be selectively removably mounted to the various support structures of the vehicle 10 via respective clamp members 250. Other types of work assist items could also be used. Each exemplary work assist item 130 comprises a connection element 290, which includes the projections 284 that are received in the openings 282 of the mount member 278 and the opening 286 to removably support the work assist item 130 on the support structure via the clamp member 250.

According to embodiments, since each of the support structures described herein includes a portion having the same first predefined cross-sectional shape, the clamp members 250 are able to be removably coupled to any of these support structures at their respective portions having the first predefined cross-sectional shape as desired. Hence, work assist items 130 can be selectively mounted at many locations throughout the operator compartment 16 on different types of support structures as desired using clamp members 250 having a common geometry, so as to avoid the need to produce a plurality of differently shaped clamp members that have a particular geometry for being coupled to specific differently shaped components on the vehicle 10. FIG. 2 illustrates a plurality of exemplary locations for clamp members 250 to be removably coupled to various support structures of the vehicle 10, wherein a first one of the support structures includes a first portion having the first predefined cross-sectional shape, a second one of the support structures includes a second portion having the first predefined cross-sectional shape, a third one of the support structures includes a third portion having the first predefined cross-sectional shape, etc., and wherein each of these portions is able to removably support a work assist item 130.

The present embodiments are not intended to be limited to support structures having the specific first predefined cross-sectional shape illustrated in FIGS. 1-4. For example, with reference to FIG. 6, a support structure according to this exemplary embodiment, which comprises a second vertical post 84', has a different predefined cross-sectional shape than the first predefined cross-sectional shape illustrated in FIGS. 1-4. The remaining structure of the vehicle 10 and the work assist system 150 according to this exemplary embodiment may be the same or similar to the structure of the vehicle 10 and the work assist system 150 shown in FIG. 1.

Figure 7:
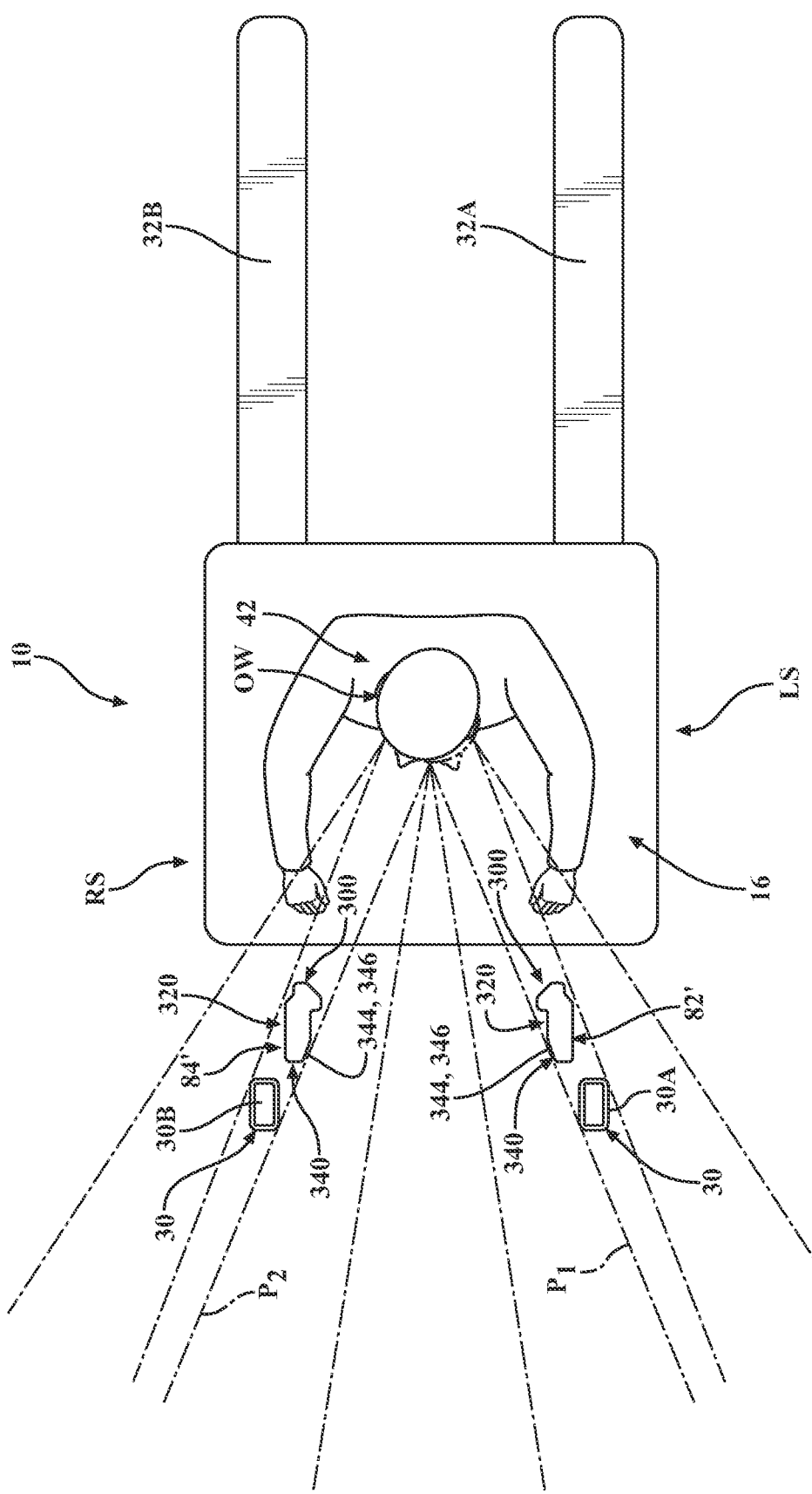
FIG. 7 is a schematic diagram of an industrial vehicle including a work assist system according to embodiments.

The second vertical post 84' according to FIG. 6 includes a bulbous first portion 300 including a front portion 302 that faces toward the operator station 42, wherein the first portion 300 is located proximate to an operator working position Ow defined within the vehicle 10, see FIG. 7. The operator working position Ow is defined as a position in the vehicle 10 where an operator stands (or sits in a sit-down vehicle) while operating the vehicle 10 from the operator station 42. In the exemplary embodiment shown in FIG. 7, the operator working position Ow is generally centered in the lateral direction LD between a vertical first beam 30A of the mast assembly 30 and a vertical second beam 30B of the mast assembly 30.

The first portion 300 further comprises an angled portion 304 extending from the front portion 302 in a laterally inward direction toward the mast assembly 30, see also FIG. 7. The first portion 300 additionally comprises a first side portion 306 that extends from the angled portion 304 and faces laterally inwardly toward the first vertical post 82', a rear portion 308 that extends from the first side portion 306 and faces toward the vertical second beam 30B of the mast assembly 30, and a second side portion 310 that extends from the front portion 302 and faces laterally outwardly away from the first vertical post 82'. The first portion 300 of the second vertical post 84' according to this embodiment defines a second predefined cross-sectional shape.

One or more clamp members 250 (one clamp member 250 is shown in FIG. 6) of the work assist system 150 according to this embodiment are able to be removably coupled to the support structure at the first portion 300. As shown in FIG. 6, the clamp member 250 may have the same geometry as the clamp member 250 described above with reference to FIGS. 3 and 4, wherein the jaw members 262, 264 of the clamp member 250 are respectively fitted around the rear portion 308 and the second side portion 310 of the first portion 300 of the second vertical post 84'. According to embodiments, the same clamp member 250 may be able to be removably coupled to support structures having either the first predefined cross-sectional shape or the second predefined cross-sectional shape.

A central portion 320 of the second vertical post 84' may comprise a first side portion 322 extending from the rear portion 308 of the first portion 300 and facing the first vertical post 82'. The central portion 320 further comprises an angled portion 324 extending from the second side portion 310 of the first portion 300 in a laterally outward direction, see also FIG. 7. A second side portion 326 of the central portion 320 extends from the angled portion 324 of the central portion 320 and faces away from the first vertical post 82'.

A rear portion 340 of the second vertical post 84' is opposed from the first portion 300 and is distal from the operator working position Ow and proximate to the vertical second beam 30B of the mast assembly 30, see FIG. 7. The rear portion 340 includes a back portion 342 facing away from the operator working position Ow and toward the vertical second beam 30B. The rear portion 340 further comprises a laterally inwardly facing side 344 having a tapered portion 346 that is tapered in the laterally outward direction as it extends away from the operator working position Ow, see FIG. 7.

The structure of the first vertical post 82', which is shown in FIG. 7, may mirror the structure of the second vertical post 84' and thus will not be specifically described herein for brevity.

With continued reference to FIG. 7, the first vertical post 82' is visually aligned, from the operator working position Ow, with the vertical first beam 30A of the mast assembly 30. That is, when the operator is located in the operator working position Ow and looks in the direction of the first vertical post 82', the vertical first beam 30A is directly aligned with the first vertical post 82'. Hence, the total lateral distance that is visually blocked by these two structures is reduced, as compared to a configuration where these structures are not visually aligned from the operator working position Ow. The second vertical post 84' is similarly visually aligned from the operator working position Ow with the vertical second beam 30B of the mast assembly 30, providing the same advantage as the first vertical post 82' being visually aligned with the vertical first beam 30A.

Moreover, the tapered portion 346 of each of the first and second vertical posts 82', 84' respectively lie generally parallel to first and second planes P1, P2 extending from the operator working position Ow to the corresponding tapered portion 346, see FIG. 7. This feature additionally reduces the total lateral distance that is visually blocked by the first and second vertical posts 82', 84'. This may be particularly advantageous when the platform assembly 14 of the vehicle 10 is raised over the top of the mast assembly 30, since none of the mast sections would be in the line of sight of the operator looking forward of the first and second vertical posts 82', 84', i.e., since the line of sight of the operator looking forward of the first and second vertical posts 82', 84' would be over the top of all of the mast sections.

Figure 8:
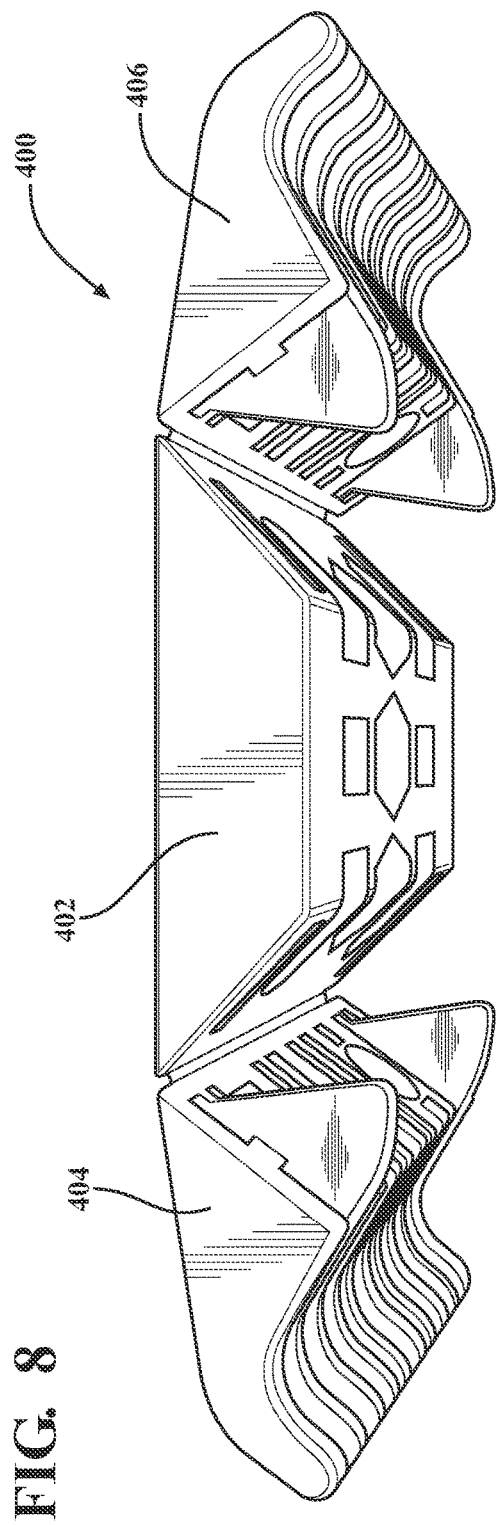
FIGS. 8 and 9 are perspective views of a clamp member according to embodiments.
Figure 9:
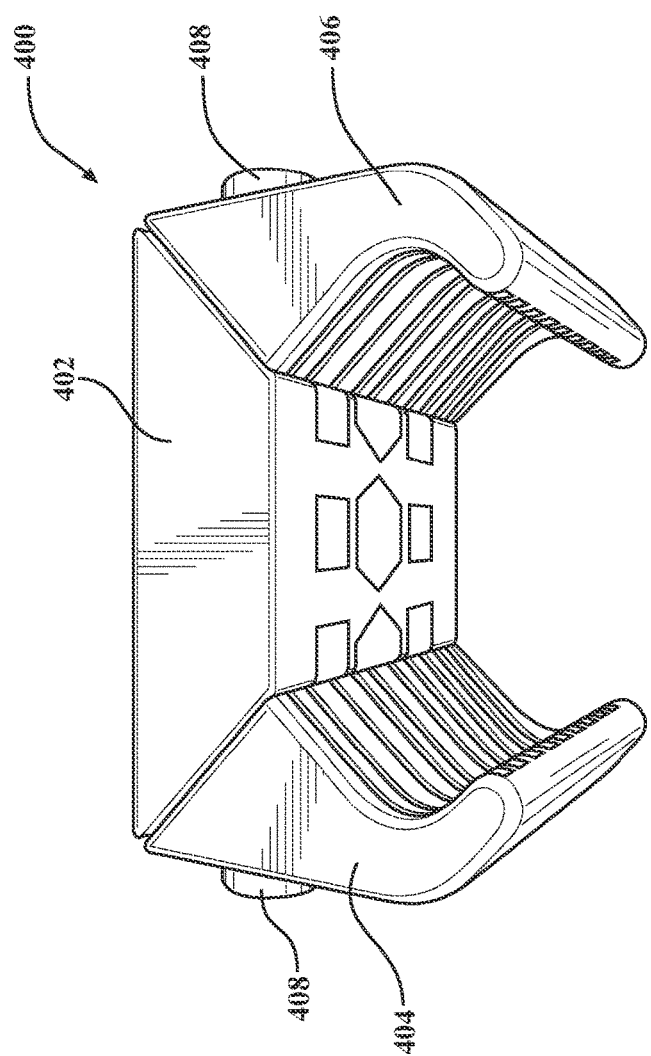
Figure 10:
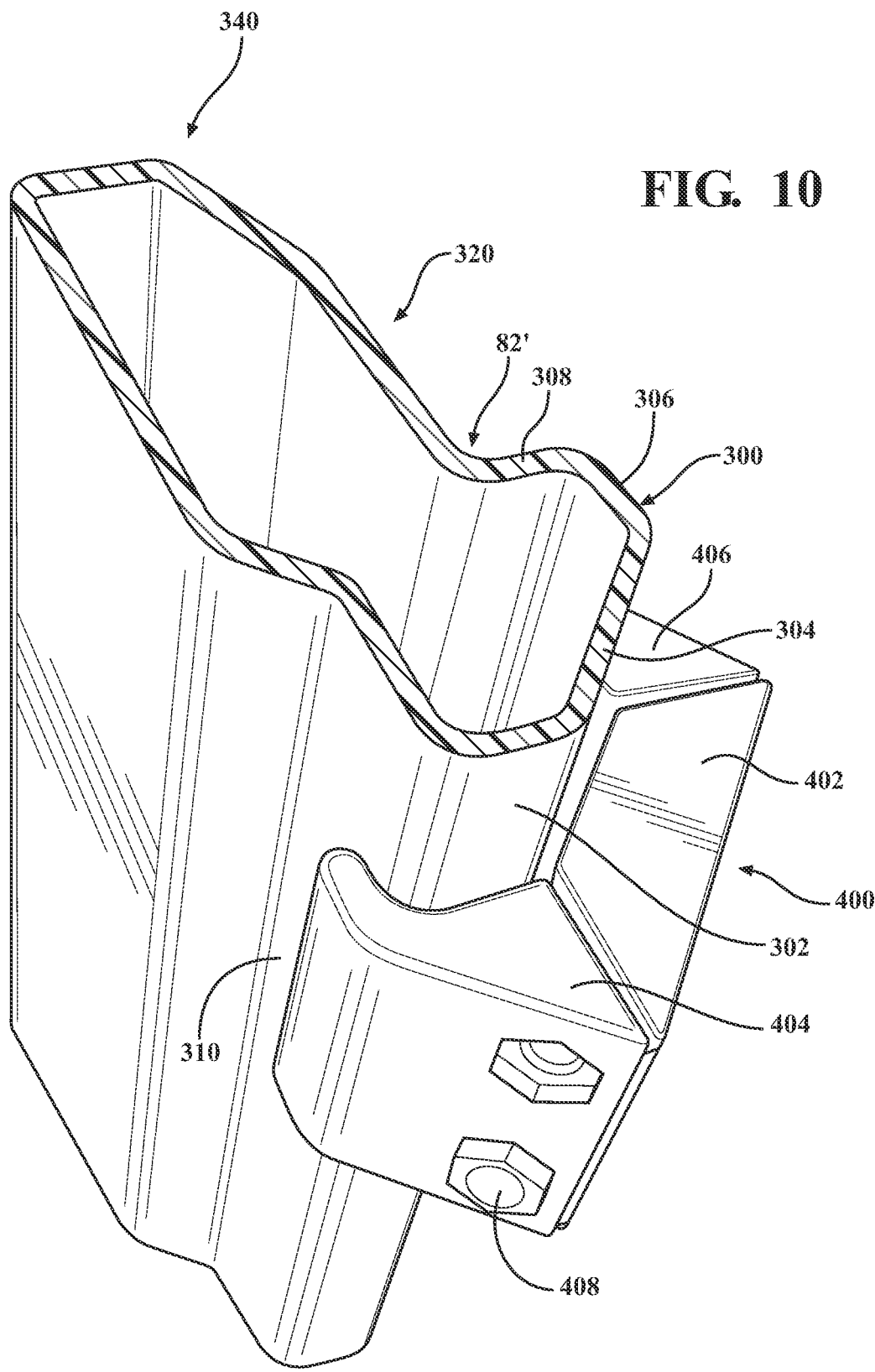
FIG. 10 is a cross sectional view of a support structure and illustrating the clamp member of FIGS. 8 and 9 mounted to the support structure.

The present embodiments are not intended to be limited to clamp members having the shape of the clamp member 250 illustrated in FIGS. 2-4 and 6. For example, FIGS. 8-10 illustrate a clamp member 400 according to another exemplary embodiment.

The clamp member 400 comprises a mount member 402 located between a pair of jaw members 404, 406 that define coupling structure of the clamp member 400 according to this embodiment. The mount member 402 includes mounting structure that may be the same as the mounting structure 280 of the clamp member 250 described above. The clamp member 400 is removably coupled to a portion of a support structure, e.g., to a first portion 300 of a first vertical post 82' as shown in FIG. 10 or to the first portion 210 of the support structure illustrated in FIGS. 3 and 4, using one or more securing structures, e.g., bolts 408. The jaw members 404, 406 of the clamp member 400 according to this embodiment are shown as being respectively fitted around the rear portion 308 and the second side portion 310 of the first portion 300 of the first vertical post 82' to capture the first portion 300 therebetween so as to removably couple the clamp member 400 to the support structure, see FIG. 10.

FIGS. 11 and 12 illustrate a clamp member 500 according to yet another exemplary embodiment. The clamp member 500 according to this embodiment comprises a mount member 502 located between a pair of jaw members 504, 506 that define coupling structure of the clamp member 500. The clamp member 500 is removably coupled to a portion of a support structure, e.g., to a first portion 300 of a second vertical post 84' as shown in FIG. 12 or to the first portion 210 of the support structure illustrated in FIGS. 3 and 4, using one or more securing structures, e.g., bolts 508. The jaw members 504, 506 of the clamp member 500 according to this embodiment are shown as being respectively fitted around the rear portion 308 and the second side portion 310 of the first portion 300 of the second vertical post 84' to capture the first portion 300 therebetween so as to removably couple the clamp member 500 to the support structure, see FIG. 12.

The mount member 502 according to this embodiment includes mounting structure 510 comprising mounting hardware that removably supports a work assist item 130. In the illustrated embodiment, the mounting hardware comprises a series of openings 512, see FIG. 12, one or more of which are provided for releasably receiving corresponding projections 284 (see FIG. 5E) provided on a work assist item 130 that is to be removably supported on the support structure by the clamp member 500. One or more fasteners, such as, for example, screws or bolts, may be inserted through one or more of the openings 512 and through corresponding opening(s) 286 in the work assist item 130 to removably secure the work assist item 130 to the clamp member 500. Other suitable types of mounting hardware capable of removably supporting the work assist item 130 could also be used.

The clamp member 500 according to this embodiment further comprises a pair of hook members 520 located on opposed outwardly facing surfaces 504A, 506A of the respective jaw members 504, 506. As shown in FIG. 12, the hook member 520 may removably support a work assist item 130, which work assist item 130 is illustrated in FIG. 12 as a mesh net structure.

Figure 13:
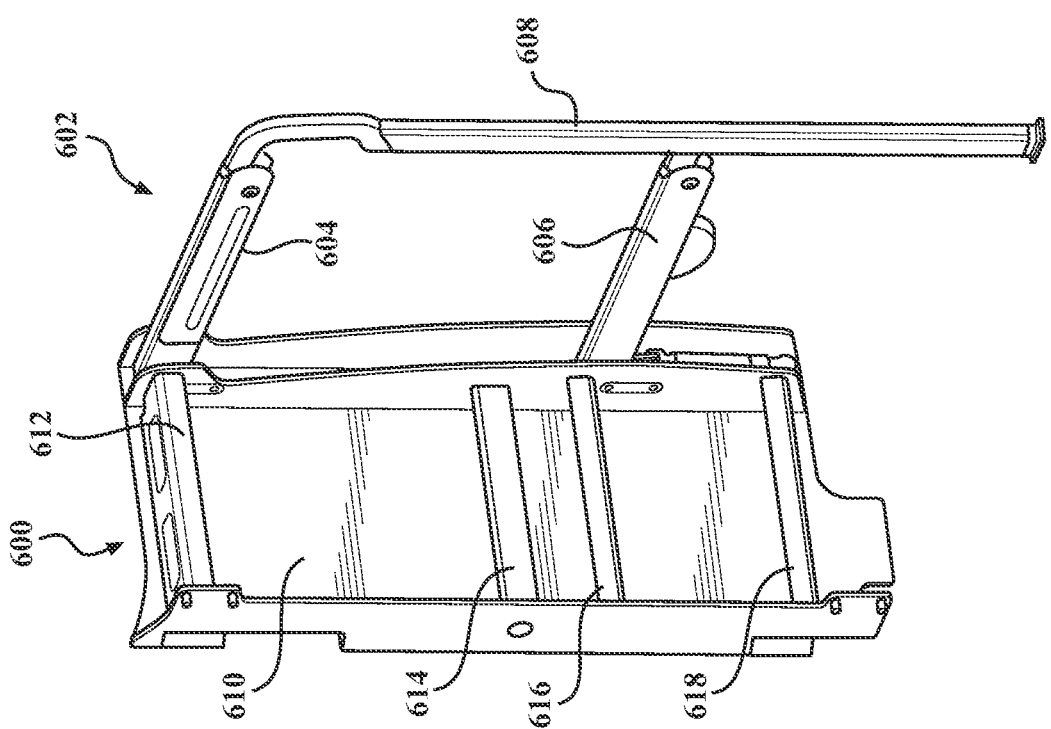

With reference now to FIG. 13, a side restraint assembly 600 in accordance with embodiments may replace the second side restraint 48 of the vehicle 10 described above for FIG. 1. A similar side restraint assembly may also replace the first side restraint 46 of the vehicle 10 described above for FIG. 1.

The exemplary side restraint assembly 600 of FIG. 13 includes a side restraint 602 comprising support structures in the form of a pair of horizontal guard bars 604, 606 and a vertical guard bar 608. Any number of horizontal and vertical guard bars may be used to form the side restraint 602. One or more of these guard bars 604, 606, 608 may have a first portion defining a predefined cross-sectional shape for removably securing a clamp member thereon, which clamp member is for removably supporting a work assist item thereon, as disclosed herein.

The side restraint assembly 600 of FIG. 13 further includes a panel 610. One or more support structures in the form of horizontal or vertical beams may be provided on or around the panel 610. In the illustrated exemplary embodiment, four horizontal beams 612, 614, 616, 618 are provided, wherein one or more of these horizontal beams 612, 614, 616, 618 may have a first portion defining a predefined cross-sectional shape for removably securing a clamp member thereon, which clamp member is for removably supporting a work assist item thereon, as disclosed herein.

Figure 14:
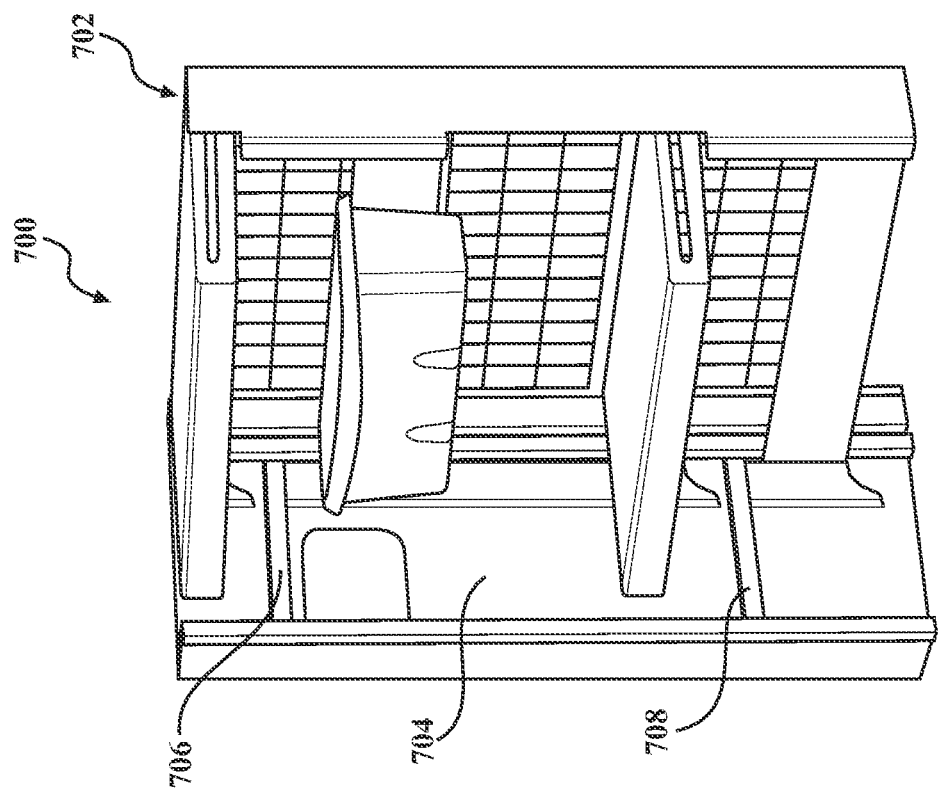
FIGS. 13 and 14 are perspective views of side restraint assemblies for an industrial vehicle according to embodiments.

FIG. 14 depicts another side restraint assembly 700 that may replace the second side restraint 48 of the vehicle 10 described above for FIG. 1. A similar side restraint assembly may also replace the first side restraint 46 of the vehicle 10 described above for FIG. 1.

The side restraint assembly 700 of FIG. 14 comprises a side restraint 702. The side restraint 702 of FIG. 14 is immovable with respect to a panel 704 of the side restraint assembly 700. The side restraint 702 of FIG. 14 thus provides a fixed work station and includes structure, e.g., shelves, bins, etc. for supporting items such as printers, box storage, tape, tape guns, shipping supplies, etc.

One or more support structures in the form of horizontal or vertical beams may be provided on or around the panel 704. In the illustrated exemplary embodiment, two horizontal beams 706, 708 are provided, wherein one or more of these horizontal beams 706, 708 may have a first portion defining a predefined cross-sectional shape for removably securing a clamp member thereon, which clamp member is for removably supporting a work assist item thereon, as disclosed herein. Bars that define the frame of the side restraint 702 according to this embodiment may also define support structures for removably securing clamp members thereto as desired.

With reference now to FIGS. 15 and 16, a clamp member 800 according to another exemplary embodiment is shown. The clamp member 800 comprises a mount member 802 located between a pair of jaw members 804, 806 that define coupling structure of the clamp member 800 according to this embodiment. The mount member 802 includes mounting structure that may be the same as the mounting structure 280 of the clamp member 250 described above. The clamp member 800 is removably coupled to a portion of a support structure, e.g., to a first portion 300 of a first vertical post 82' as shown in FIG. 10 or to the first portion 210 of the support structure illustrated in FIGS. 3 and 4, using one or more securing structures, e.g., bolts 808, see FIG. 16. The jaw members 804, 806 of the clamp member 800 according to this embodiment may be respectively fitted around the rear portion 308 and the second side portion 310 of the first portion 300 of the first vertical post 82' (see FIG. 10) to capture the first portion 300 therebetween so as to removably couple the clamp member 800 to the support structure.

The clamp member 800 according to FIGS. 15 and 16 includes one or more non-skid surfaces 820, illustrated in this exemplary embodiment as two spaced apart non-skid surfaces 820. The non-skid surfaces 820 may be, for example, rubber pads, hook and loop tape, abrasive pads, etc., and are located on an inner surface 800A of the clamp member 800 that engages the support structure when the clamp member 800 is coupled to the support structure. The non-skid surfaces 820 have a different coefficient of friction than the inner surface 800A of the clamp member 800 and may militate against sliding movement of the clamp member 800 on the support structure, and/or may reduce vibrations transmitted from the support structure to the clamp member 800 and then on to the work assist item that is supported by the clamp member 800. It is noted that the one or more non-skid surfaces 820 could be located elsewhere on the inner surface 800A and/or on the jaw members 804, 806 of the clamp member 800 as desired. It is also noted that the one or more non-skid surfaces 820 illustrated in FIGS. 15 and 16 could be used with the other clamp members disclosed herein, such as the clamp members 250, 400, 500.

Representative embodiments of the present disclosure described above can be described as follows:

A. A work assist system for an industrial vehicle comprising:
 a first support structure including a first portion having a predefined cross-sectional shape; and
 a clamp member comprising:
 coupling structure for removably coupling the clamp member to the first support structure at the first portion; and
 mounting structure that removably supports a work assist item that is usable by an operator located in an operator compartment of the vehicle.

B. The work assist system of paragraph A, wherein the first support structure is a vertical post.

C. The work assist system of paragraph B, wherein the vertical post supports an overhead guard of the vehicle.

D. The work assist system of any of paragraphs A-C, wherein the vehicle defines an operator working position from which an operator operates the vehicle, and wherein the first support structure is visually aligned, from the operator working position, with a vertical first beam of a mast assembly of the vehicle.

E. The work assist system of paragraph D, wherein the operator working position is generally centered in a lateral direction between the first beam of the mast assembly and a vertical second beam of the mast assembly, the lateral direction defined between opposing left and right sides of the vehicle.

F. The work assist system of paragraph D or E, wherein the support structure comprises a first portion proximate to the operator working position and to which the clamp member is removably coupled, and a rear portion distal from the operator working position, the rear portion including a laterally inwardly facing side having a tapered portion that is tapered in the laterally outward direction as it extends away from the operator working position.

G. The work assist system of paragraph F, wherein the tapered portion is generally parallel to a plane extending from the operator working position to the tapered portion.

H. The work assist system of any of paragraphs A-G, wherein the predefined cross-sectional shape is defined by a first portion of the support structure proximate to an operator working position from which an operator operates the vehicle, wherein the clamp member is removably coupled to the first portion.

The work assist system of any of paragraphs A-H, further comprising a second support structure including a second portion having the same predefined cross-sectional shape as the first support structure, wherein the clamp member can be removably coupled to either the first portion of the first support structure or the second portion of the second support structure.

J. The work assist system of paragraph I, wherein the first and second support structures are different types of structures.

K. The work assist system of paragraph J, wherein the first support structure comprises a vertical post and the second support structure comprises a horizontal beam.

L. The work assist system of paragraph I or J, wherein the first and second support structures are first and second vertical posts.

M. The work assist system of Paragraph L, wherein the first and second vertical posts support an overhead guard of the vehicle.

N. The work assist system of paragraph L or M, wherein:
 the vehicle defines an operator working position from which an operator operates the vehicle;
 the first vertical post is visually aligned, from the operator working position, with a vertical first beam of a mast assembly of the vehicle; and
 the second vertical post is visually aligned, from the operator working position, with a vertical second beam of the mast assembly.

O. The work assist system of paragraph N, wherein the operator working position is generally centered in a lateral direction between the vertical first beam of the mast assembly and the vertical second beam of the mast assembly, the lateral direction defined between opposing left and right sides of the vehicle.

P. The work assist system of paragraph N or O, wherein the predefined cross-sectional shape of each of the first and second portions of the respective first and second vertical posts include:
 a first portion proximate to the operator working position, wherein the clamp member is selectively removably coupled to the first vertical post or the second vertical post at its first portion.

Q. The work assist system of paragraph P, wherein the first and second vertical posts each further include:
 a rear portion distal from the operator working position, the rear portion including a laterally inwardly facing side having a tapered portion that is tapered in the laterally outward direction as it extends away from the operator working position.

R. The work assist system of paragraph Q, wherein:
 the tapered portion of the first vertical post is generally parallel to a plane extending from the operator working position to the tapered portion of the first vertical post; and
 the tapered portion of the second vertical post is generally parallel to a plane extending from the operator working position to the tapered portion of the second vertical post.

S. The work assist system of paragraph A, wherein the first support structure is a horizontal beam located in an overhead guard of the vehicle.

T. The work assist system of any of paragraphs A-S, wherein the clamp member further comprises one or more non-skid surfaces located on a surface of the clamp member that engages the first support structure when the clamp member is coupled to the first support structure.

The various features, aspects, and embodiments described herein can be used in any combination(s) with one another, or on their own.

Having thus described embodiments in detail, it will be apparent that modifications and variations are possible without departing from the scope of the appended claims.

What is claimed is:

1. A work assist system for an industrial vehicle that defines an operator working position from which an operator operates the vehicle, the work assist system comprising:
   a first support structure including a first portion having a predefined cross-sectional shape, the first support structure comprising a vertical post that supports an overhead guard of the vehicle, wherein the first support structure is visually aligned, from the operator working position, with a vertical first beam of a mast assembly of the vehicle; and
   a clamp member comprising:
      coupling structure for removably coupling the clamp member to the first support structure at the first portion; and
      mounting structure that removably supports a work assist item that is usable by an operator located in an operator compartment of the vehicle;
   wherein the first support structure comprises the first portion proximate to the operator working position and to which the clamp member is removably coupled, and a rear portion distal from the operator working position, the rear portion including a laterally inwardly facing side having a tapered portion that is tapered in the laterally outward direction as it extends away from the operator working position.

2. The work assist system of claim 1, wherein the operator working position is generally centered in a lateral direction between the first beam of the mast assembly and a vertical second beam of the mast assembly, the lateral direction defined between opposing left and right sides of the vehicle.

3. The work assist system of claim 1, wherein the tapered portion is generally parallel to a plane extending from the operator working position to the tapered portion.

4. The work assist system of claim 1, wherein the predefined cross-sectional shape is defined by the first portion of the first support structure proximate the operator working position, wherein the clamp member is removably coupled to the first portion.

5. The work assist system of claim 1, further comprising a second support structure including a second portion having the same predefined cross-sectional shape as the first support structure, wherein the clamp member can be removably coupled to either the first portion of the first support structure or the second portion of the second support structure.

6. The work assist system of claim 5, wherein the first and second support structures are different types of structures.

7. The work assist system of claim 6, wherein the second support structure comprises a horizontal beam.

8. The work assist system of claim 1, wherein the second support structure comprises a second vertical post.

9. The work assist system of claim 8, wherein the second vertical post supports the overhead guard of the vehicle.

10. The work assist system of claim 9, wherein the second vertical post is visually aligned, from the operator working position, with a vertical second beam of the mast assembly.

11. The work assist system of claim 10, wherein the operator working position is generally centered in a lateral direction between the vertical first beam of the mast assembly and the vertical second beam of the mast assembly, the lateral direction defined between opposing left and right sides of the vehicle.

12. The work assist system of claim 11, wherein the predefined cross-sectional shape of the second portion of the second vertical post includes a first portion proximate to the operator working position, wherein the clamp member is selectively removably coupled to the first vertical post or the second vertical post at its first portion.

13. The work assist system of claim 12, wherein the second vertical post further includes a rear portion distal from the operator working position, the rear portion including a laterally inwardly facing side having a tapered portion that is tapered in the laterally outward direction as it extends away from the operator working position.

14. The work assist system of claim 13, wherein:
   the tapered portion of the first vertical post is generally parallel to a plane extending from the operator working position to the tapered portion of the first vertical post; and
   the tapered portion of the second vertical post is generally parallel to a plane extending from the operator working position to the tapered portion of the second vertical post.

15. The work assist system of claim 1, wherein the clamp member further comprises one or more non-skid surfaces located on a surface of the clamp member that engages the first support structure when the clamp member is coupled to the first support structure.

* * * * *